United States Patent [19]
Buie et al.

[11] Patent Number: 5,613,730
[45] Date of Patent: Mar. 25, 1997

[54] TEMPERATURE CONTROLLED SEAT COVER ASSEMBLY

[76] Inventors: Dan Buie, Rte. 1 Box 169-A, Prattsville, Ak. 72129; Janice Buie, P.O. Box 1593, Kenai, Ak. 99611

[21] Appl. No.: 412,909

[22] Filed: Mar. 29, 1995

[51] Int. Cl.⁶ .................................................. A47C 7/74
[52] U.S. Cl. .................... 297/180.12; 297/180.15; 297/228.12; 297/180.11; 392/480; 392/481
[58] Field of Search .................. 297/180.11, 180.13, 297/180.1, 180.12, 228.12, 229, 180.15; 62/62, 259.3; 392/480, 481, 472; 219/202, 217; 237/12.3 R, 12.3 B, 28; 165/41

[56] References Cited

U.S. PATENT DOCUMENTS

| | | | |
|---|---|---|---|
| 1,882,169 | 10/1932 | Wedler | 297/228.12 |
| 3,738,702 | 6/1973 | Jacobs | 297/180 |
| 4,175,297 | 11/1979 | Robbins et al. | 297/180.13 X |
| 4,458,138 | 7/1984 | Adrian et al. | 392/481 X |
| 4,561,441 | 12/1985 | Kolodzies | 297/180.11 X |
| 4,602,145 | 7/1986 | Roberts | 392/481 X |
| 4,695,091 | 9/1987 | Altmann et al. | 297/180.12 |
| 4,758,709 | 7/1988 | Schiebelhuth et al. | 392/480 X |
| 4,923,248 | 5/1990 | Feher | 297/180.11 |
| 4,964,674 | 10/1990 | Altmann et al. | 297/180.12 |
| 4,966,145 | 10/1990 | Kikumoto et al. | 297/180.15 X |
| 5,002,335 | 3/1991 | Bengtsson | 297/180.12 |
| 5,401,793 | 3/1995 | Kobayashi et al. | 524/401 |
| 5,402,705 | 4/1995 | Bailleux et al. | 392/480 X |

Primary Examiner—Peter M. Cuomo
Assistant Examiner—Stephen Vu
Attorney, Agent, or Firm—David L. Volk; Brendan B. Dix

[57] ABSTRACT

The present invention relates to a temperature controlled seat cover assembly, the assembly dimensioned and adapted to, in part, be releasably fitted over a seat and seat back portion of a vehicle seat to heat a user in contact therewith. The assembly includes an outer fabric liner defining an internal space; a fluid conduit, a condenser, a pump assembly at least one heating element disposed within the internal space. The heating element adapted to generate heat from resistance to electrical current therethrough; fire proof insulative material disposed within the internal space between the heating element and the outer fabric liner; straps attached to the outer fabric liner for releasably securing the assembly to a vehicle seat. A switch assembly having an adapter adapted to be plugged into a cigarette lighter within the interior of an automobile. The switch assembly provided to supply electrical current from the cigarette lighter to either the heater element or the condenser and pump assembly.

3 Claims, 6 Drawing Sheets

TEMPERATURE CONTROLLED SEAT COVER ASSEMBLY

BACKGROUND OF THE INVENTION

1. FIELD OF THE INVENTION

The present invention relates to a temperature controlled heat cover assembly, and more particularly to a seat cover assembly which is readily portable.

2. DESCRIPTION OF THE PRIOR ART

Electrical resistance wires have been used to heat various types of articles for warming the human body, including blankets, heating pads, jackets and pants. The power source for these articles is often batteries, as for example illustrated in U.S. Pat. No. 3,427,431 to Costanzo. The Costanzo patent discloses the use of two low voltage batteries connected in series to generate the voltage required for energizing an electrical resistance heater for a sleeping bag. In U.S. Pat. No. 4,279,255 to Hoffman, a battery pack including two "D" two-volt lead acid rechargeable batteries having a combined voltage of four volts are provided for heating an electrical resistance heater that could be applied to various parts of the body. A major problem associated with these articles is the requirement of a battery source. Typically the batteries are quickly drained by the user limiting the article to a short period of usefulness. In addition, one can not readily determine how much life is left on the battery supply at a given time.

Another application for an electrical resistance heater is an automobile or truck seat. Car manufacturers have recently provided heated seats as an expensive option on luxury cars. Heated seats have the benefit of delivering heat directly to the user rather than first heating the whole interior compartment as does the typical automobile heater. Although these integrally designed heaters within the seats provide a desired benefit, they do not help the overwhelming majority of us who do not own such cars. It would therefore be desirable to have an after market vehicle seat warmer which can be disposed on an existing vehicle seat.

Also well known in the prior art is the use fluid to cool a surrounding conduit. The fluid circulating through the conduit by a pump can cool the surrounding conduit as long as the fluid is at a lower temperature. One common way to lower the temperature in the conduit is through the use of a condenser. The condenser cools fluid coming from the return end of the conduit. The cooled fluid is then pumped back through the conduit to repeat the cycle. A need exists for a seat cover which can both heat and cool the seat cover in response to the direction of a user.

SUMMARY OF THE INVENTION

The present invention relates to a portable temperature controlled seat cover assembly, the assembly dimensioned and adapted to be releasably fitted over a seat and seat back portion of a vehicle seat to heat a user in contact therewith. The assembly includes an outer fabric liner defining an internal space, and a fluid conduit disposed within the internal space and containing a fluid. At least one heating element disposed within the internal space and is in contact with the exterior of the fluid conduit. The heating element is adapted to generate heat from resistance to electrical current therethrough and transfer the heat to the fluid conduit to heat the fluid therein. Fire proof insulative material is disposed within the internal space between the heating element and the outer fabric liner. Straps are attached to the outer fabric liner for releasably securing the assembly to a vehicle seat. An electrical cord having an adapter to be plugged into a cigarette lighter within the interior of a vehicle, supplies electrical current from the cigarette lighter through the cord to a switch assembly. The switch assembly is configured to direct electrical power to the heating element when a knob on the switch assembly is placed in a "hot" position, and to direct electrical current to a condenser and pump assembly when the knob is placed in a "cold" position. The condenser is in communication with the fluid in the fluid conduit and is adapted to condense and cool the fluid. The pump assembly is in communication with the condenser and the fluid conduit to cirulate the fluid through the conduit.

The principal object of the present invention is to provide a temperature controlled seat cover that can be fitted onto an existing seat.

Another object of the present invention is to provide a seat cover which is readily and conveniently portable allowing the seat cover to be transferrable between vehicles.

A further object is to provide a heated seat cushion which is economical to make and rugged.

Yet another object of the present invention is to provide a seat cover which does not require batteries as a power source but rather can be plugged into a cigarette lighter of a vehicle.

Numerous innovations for seat covers and article heaters have been provided in the prior art that are adapted to be used. Even though these innovations may be suitable for the specific individual purposes to which they address, they would not be suitable for the purposes of the present invention as heretofore described.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—vehicle seat cover assembly
12—outer fabric liner
14—seam
16—seat portion
18—seat back portion
20—insulative material
22—heating element
24—electrical cord
26—adapter
28—straps
30—rings
40—switch assembly
42—knob
44—condenser
46—pump assembly
48—fluid conduit
50—car seat
90—vehicle

BRIEF DESCRIPTION OF THE PREFERRED EMBODIMENT

DETAILED DESCRIPTION OF THE PREFERRED EMBODIMENT

Figure 1:
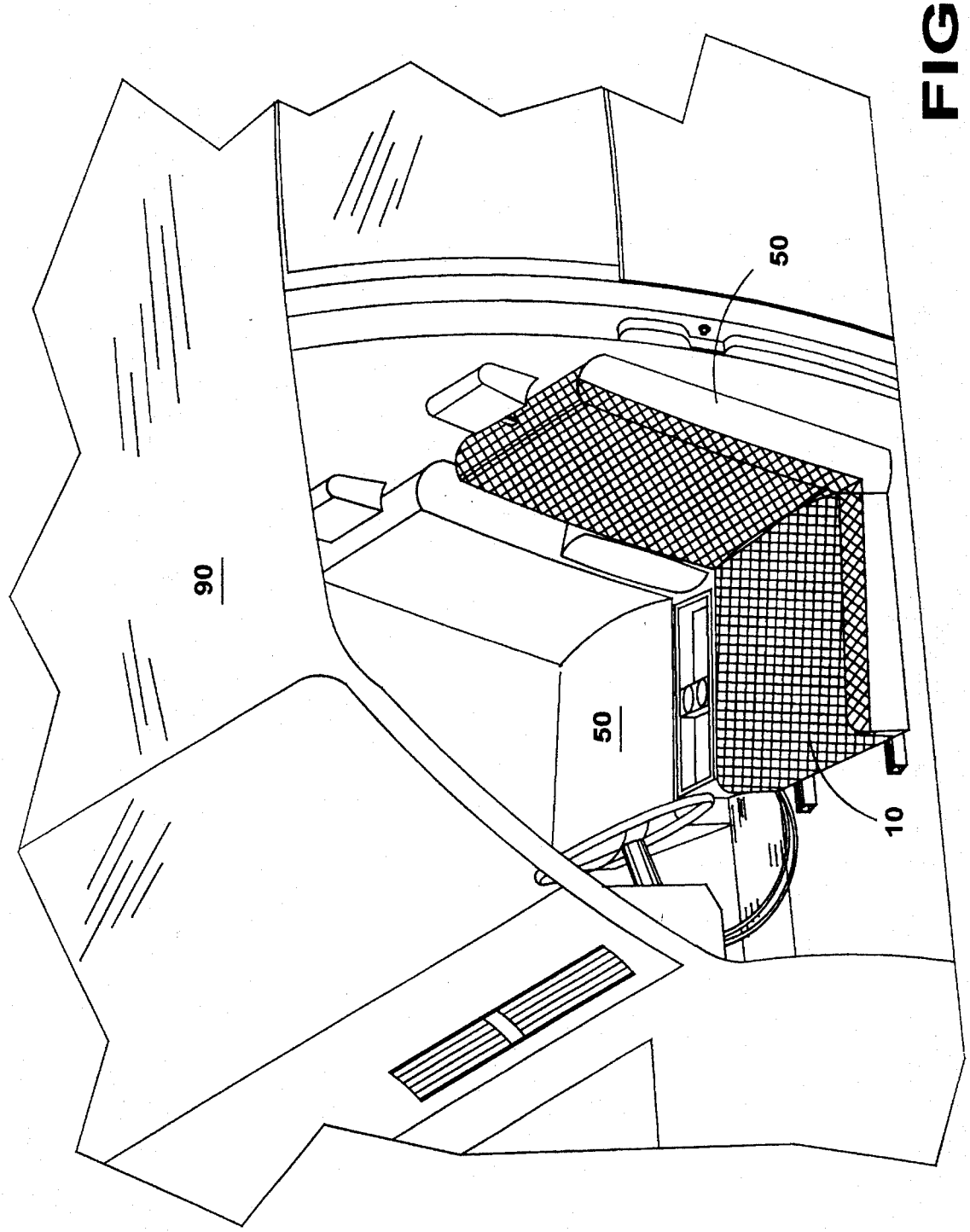
FIG. 1 is a perspective view of an automobile illustrating car seats therein.
Figure 2:
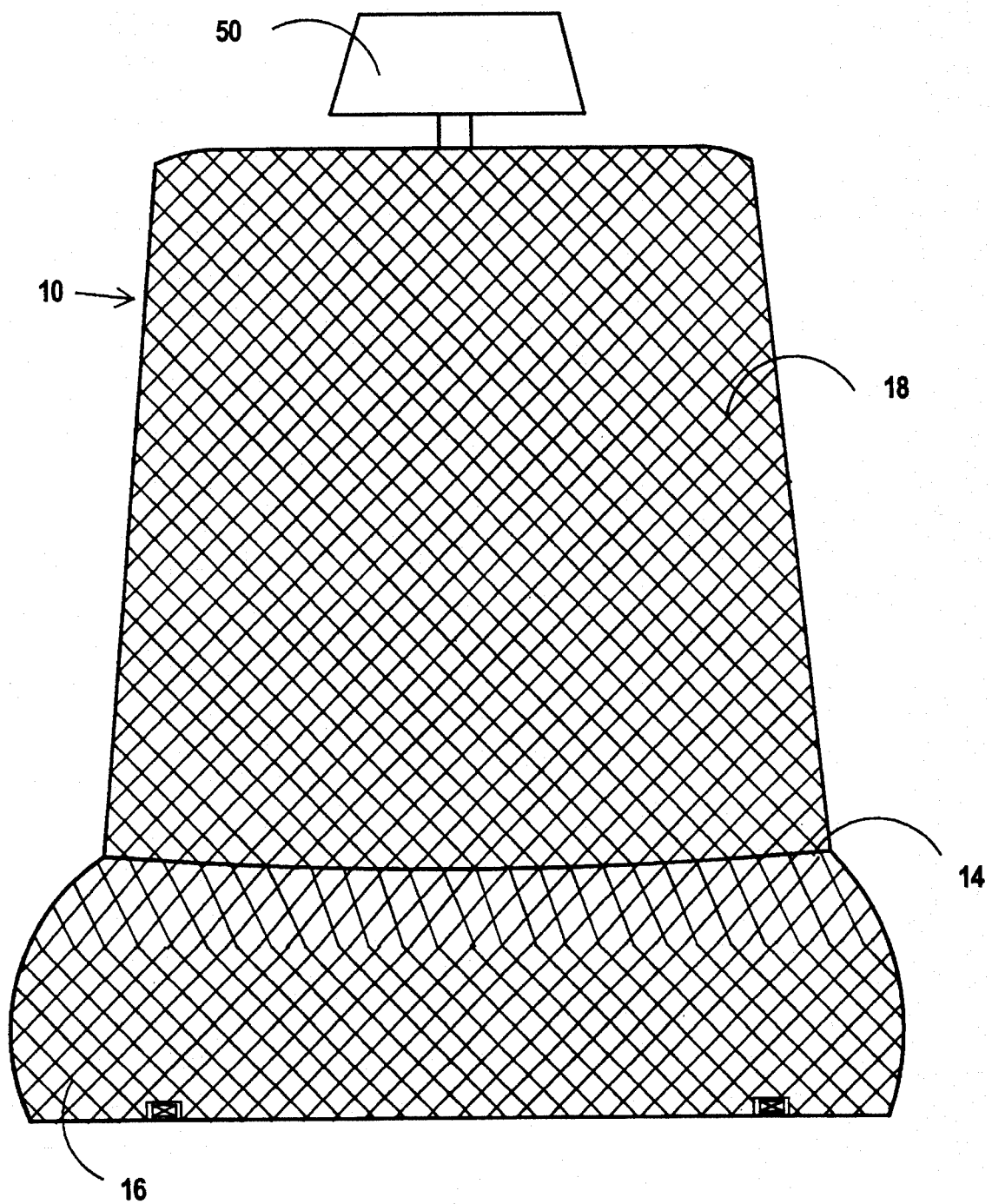
FIG. 2 is an elevational view of a seat cover constructed in accordance with a preferred embodiment of the present invention fitted on a vehicle seat.
Figure 3:
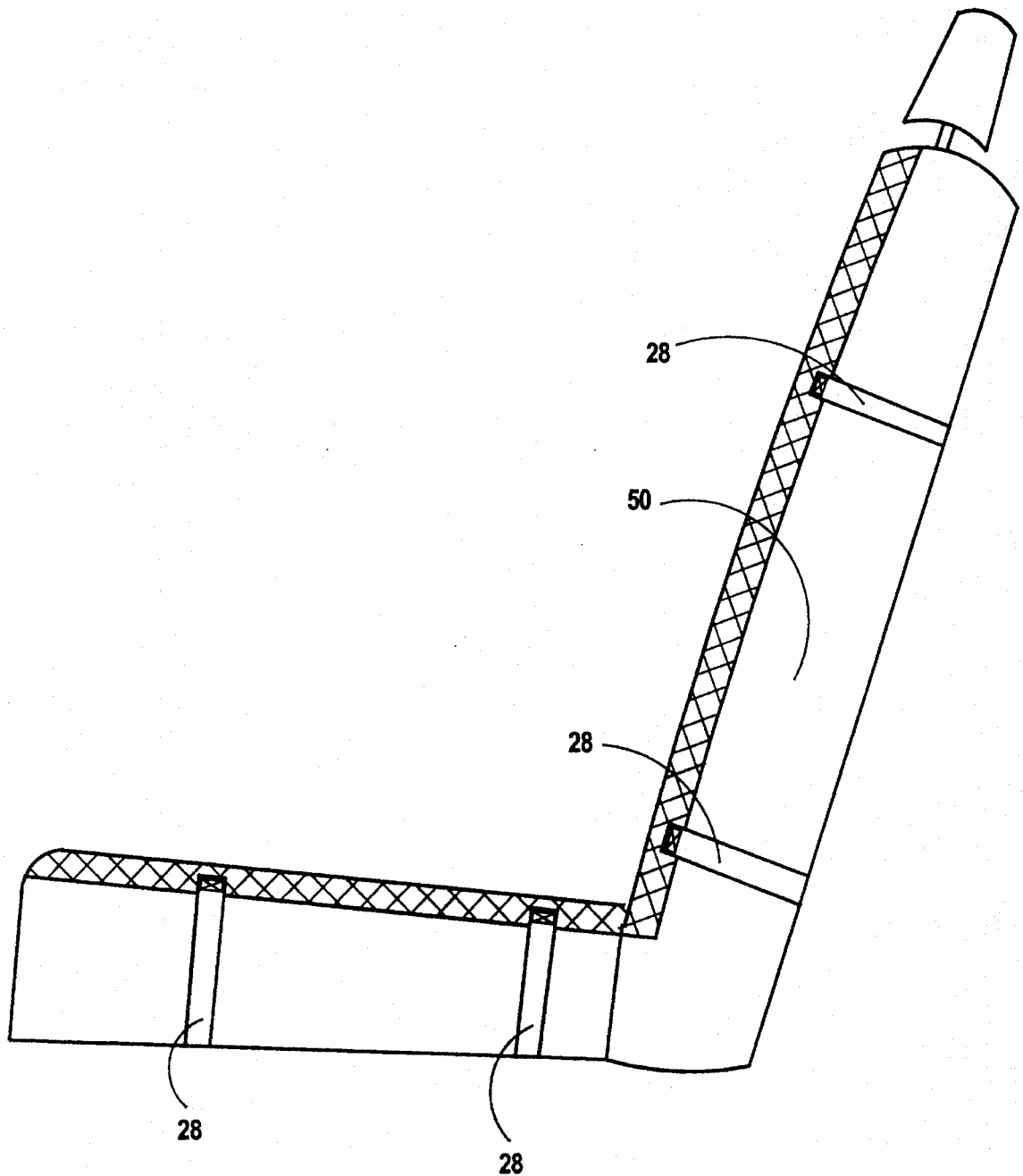
FIG. 3 is a side view of the seat cover of FIG. 2.

Firstly, referring to FIG. 1, vehicle 90 is shown having a traditional interior arrangement incorporating two bucket seats 50. Referring to FIGS. 2–6, vehicle seat cover assembly 10 is shown fitted onto one of the seats 50. Seat cover assembly 10 includes outer fabric liner 12 defining an internal space. The fabric liner 12 has a seam 14 separating the assembly 10 into a seat portion 16 and a seat back portion 18. The seat portion 16 is dimensioned to be disposed on the seat portion of the seat 50 while the seat back portion 18 is dimensioned to be fitted onto the seat back portion of the seat 50.

Figure 6:
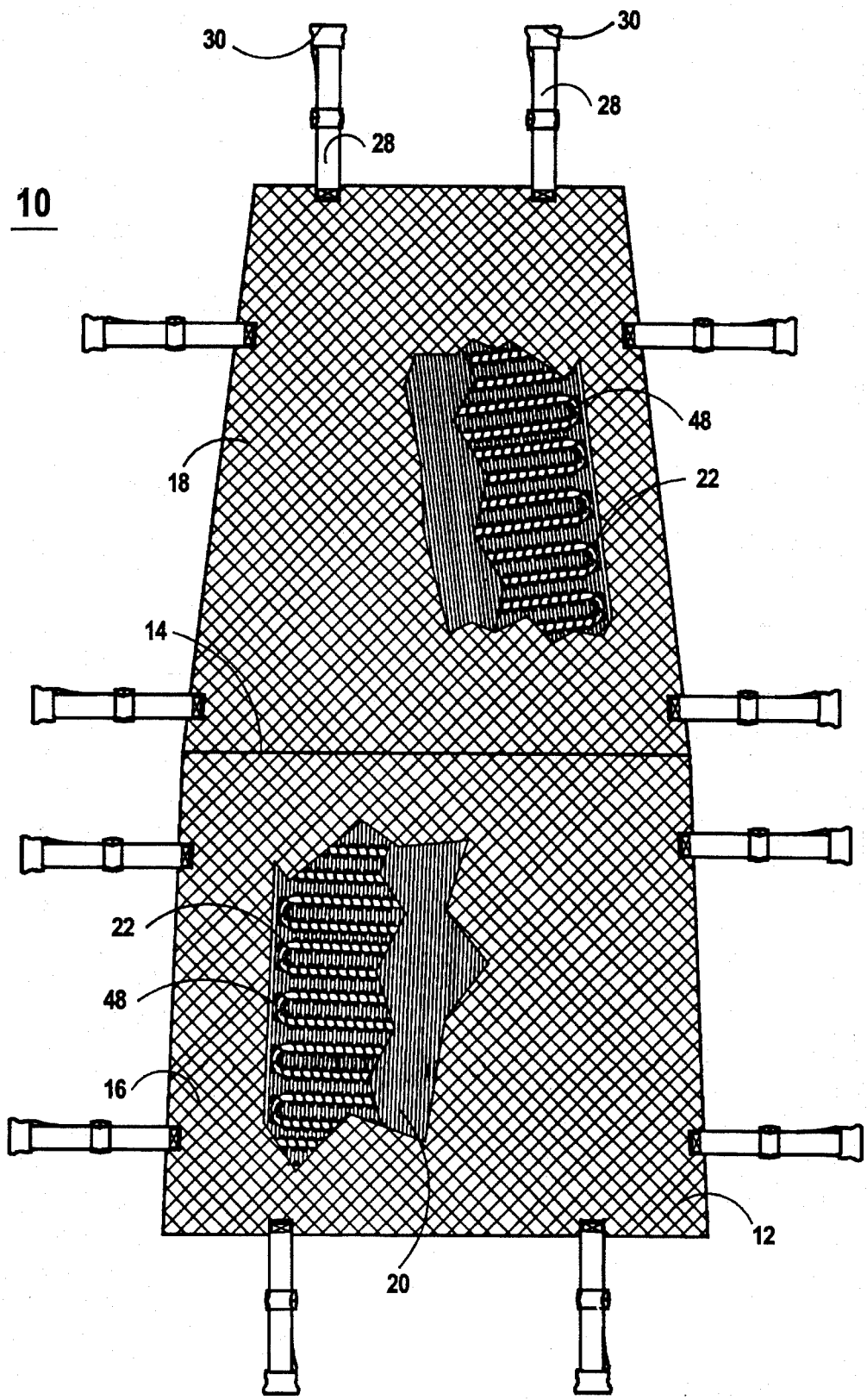
FIG. 6 is a partial cutaway view of the seat cover of FIG. 2 illustrating the fluid conduit with surrounding heating element and insulative material.

Referring to FIG. 6, fire proof insulative material is disposed within the internal space created by the outer fabric liner 12 and serves as both a cushion and an insulator to an electric resistance heating element 22 and fluid conduit 48 the heating element 22 is wrapped around the exterior of the fluid conduit 48 within the insulative material 20. When the knob 42 of the switch assembly 40 is rotated to the "HOT" position, the heating element 22 is placed into electrical communication with the cigarette lighter of the vehicle via electrical cord 24. Cord 24 has an adapter 26 at a distal end which is configured to be removably inserted into the cigarette lighter in the interior of the vehicle 90. The heating element 22 is adapted to resist electrical current therethrough, the resistance designed to generate heat to warm the fluid conduit 48 and fluid contained therein. The fluid conduit 48 and heating element 22 in turn heating the seat cover assembly 10 and a user sitting thereon.

The condenser 44 and pump assembly 46 are in fluid communication with the fluid in the fluid conduit 48 and are adapted to receive electrical power from the cord 24 only when the knob 42 of the switch assembly 40 is placed into a "COLD" position. The fluid may be any common antifreeze solution with which can tolerate a wide range of temperatures. When in the COLD position, the condenser 44 first condenses the fluid, then permits the cooled fluid to be recirculated through the fluid conduit 48 and back to the condenser by the pump assembly 46. The circulating cooled fluid in turn lowers the temperature of the seat cover assembly 10 and the user sitting thereon.

Figure 4:
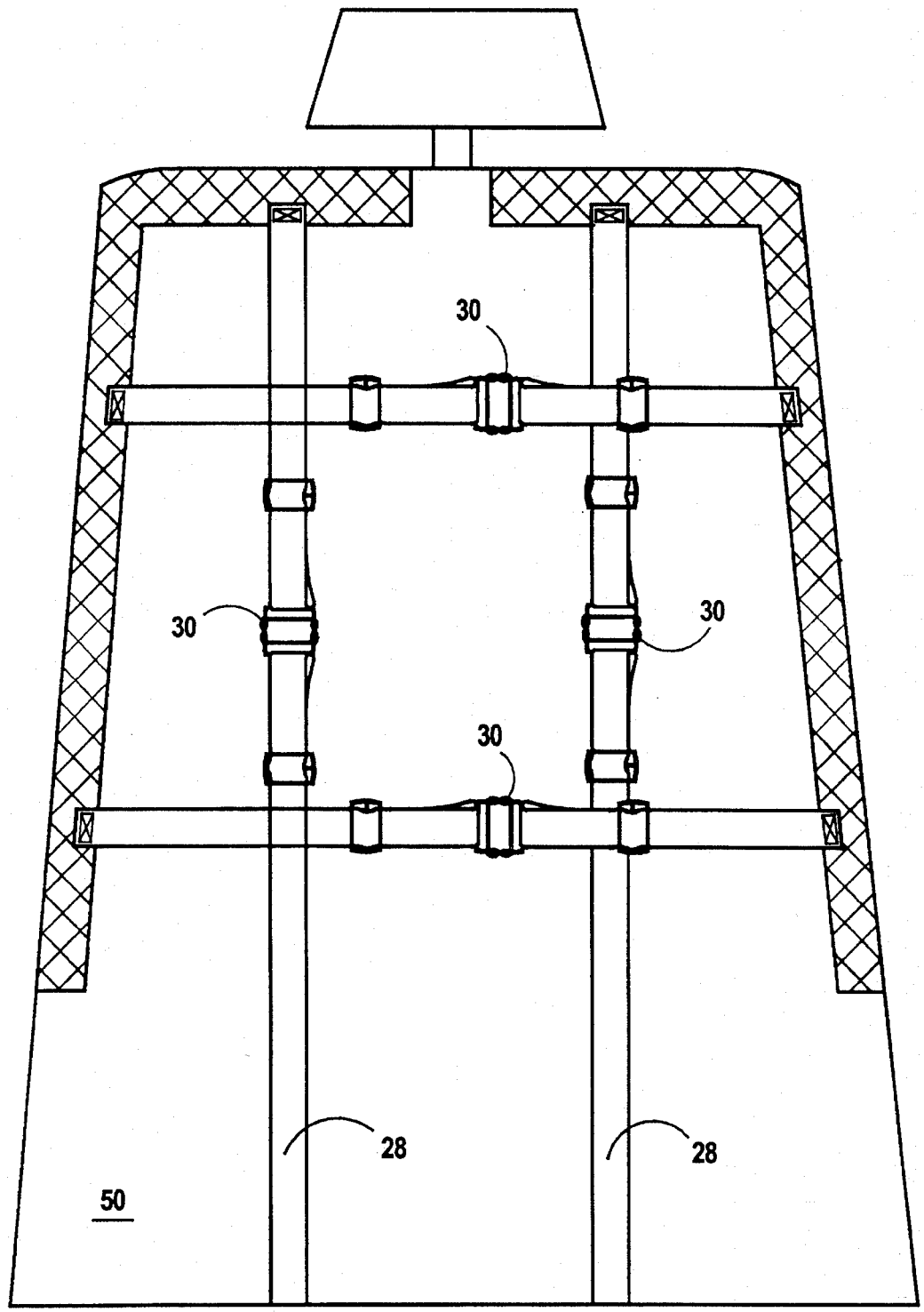
FIG. 4 is a rear view of the seat cover of FIG. 2 illustrating the straps which hold the cover onto the seat.
Figure 5:
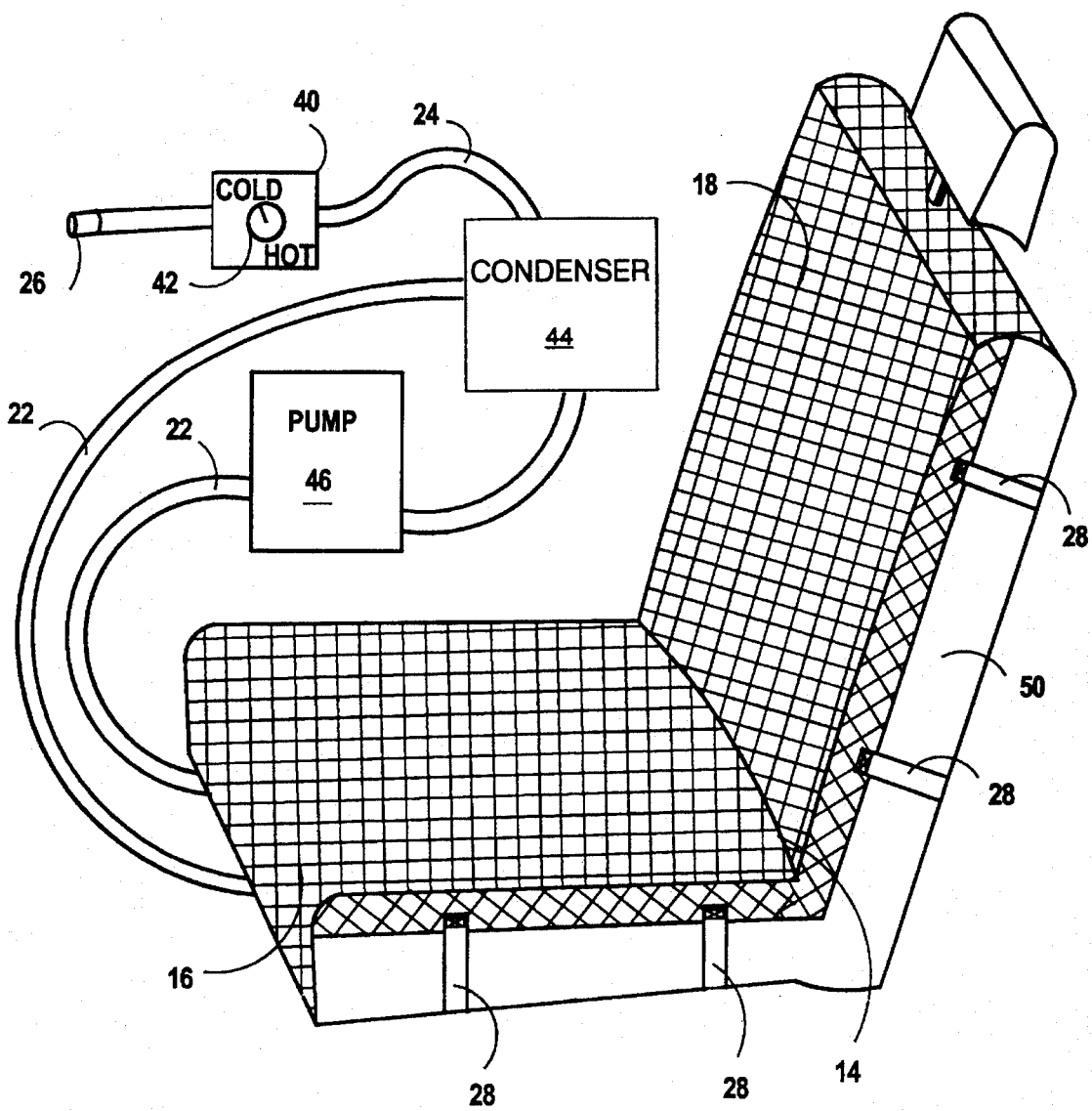
FIG. 5 is a perspective view of the seat cover of FIG. 2 illustrating the condenser and pump assembly.

Referring to FIGS. 4 and 6, adjustable length straps 26 are provided to releasably secure the assembly to the vehicle seat 50. The straps 26 are attached at a proximal end to the seat cover assembly 10 and have rings 30 attached at a distal end. The rings 30 are configured to interlock with one another along the back of the seat back of the vehicle seat 50. Although rings 30 are shown, other fasteners may be used such as snaps, buttons, or a hook and loop.

The seat cover assembly 10 is designed to be portable between car seats and to be easily secured to the car seats. The condenser 44 and pump assembly 46 are dimensioned to be stowed under the seat. Although seat cover assembly 10 is shown is dimensioned to fit bucket seats, it is contemplated that the dimensions of the seat cover assembly 10 can be adjusted to accommodate bench seats, truck seats, etc.

While the invention has been illustrated and described as embodied in a temperature controlled seat cover assembly, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A seat cover assembly comprising:

a. an outer fabric liner defining an internal space;

b. a fluid conduit disposed within said internal space, said fluid conduit containing fluid therein;

c. at least one electric resistance heating element for conducting heat to said fluid, said heating element wrapped around said fluid conduit;

d. fire proof insulative material disposed within said internal space between said heating element and said outer fabric liner;

e. a condenser for condensing said fluid to cool said fluid, said condenser in fluid communication with said fluid conduit;

f. a pump assembly for circulating said fluid through said fluid conduit, said pump assembly in fluid communication with said condenser and said fluid conduit;

g. a switch assembly for selecting between a first position wherein electricity is conducted to said heating element, and a second position wherein electricity is conducted to said condenser and said pump assembly, said switch assembly having an adapter configured to be plugged into a vehicle cigarette lighter.

2. The seat cover assembly of claim 1, wherein:

a. said switch assembly includes an electrical cord, said cord having a distal end wired to said adapter; and b. said fluid is an antifreeze solution.

3. The seat cover assembly of claim 1, wherein said fluid is an antifreeze solution.

* * * * *